United States Patent
Zhang

(10) Patent No.: US 9,559,415 B2
(45) Date of Patent: Jan. 31, 2017

(54) METHOD AND DEVICE FOR REALIZING SPECIFIC ABSORPTION RATE (SAR) CONTROL

(75) Inventor: Lu Zhang, Shenzhen (CN)

(73) Assignee: ZTE CORPORATION, Shenzhen, Guangdong (CN)

(*) Notice: Subject to any disclaimer, the term of this patent is extended or adjusted under 35 U.S.C. 154(b) by 733 days.

(21) Appl. No.: 13/980,753

(22) PCT Filed: Jun. 1, 2011

(86) PCT No.: PCT/CN2011/075100
§ 371 (c)(1),
(2), (4) Date: Jul. 19, 2013

(87) PCT Pub. No.: WO2012/100479
PCT Pub. Date: Aug. 2, 2012

(65) Prior Publication Data
US 2013/0293441 A1    Nov. 7, 2013

(30) Foreign Application Priority Data
Jan. 24, 2011 (CN) .......................... 2011 1 0026148

(51) Int. Cl.
*H04B 1/38* (2015.01)
*H01Q 3/00* (2006.01)
(Continued)

(52) U.S. Cl.
CPC .............. *H01Q 3/00* (2013.01); *H01Q 1/2275* (2013.01); *H01Q 1/245* (2013.01); *H01Q 1/52* (2013.01); *H01Q 9/30* (2013.01); *H04B 1/3838* (2013.01)

(58) Field of Classification Search
CPC .... H04B 1/3838; G01S 13/9035; H01Q 1/245
See application file for complete search history.

(56) References Cited

U.S. PATENT DOCUMENTS

| 7,589,576 B2 | 9/2009 | Itagaki |
| 7,804,451 B2 | 9/2010 | Glocker et al. |
(Continued)

FOREIGN PATENT DOCUMENTS

| CN | 1682406 A | 10/2005 |
| CN | 1762070 A | 4/2006 |
(Continued)

OTHER PUBLICATIONS

International Search Report in international application No. PCT/CN2011/075100, mailed on Nov. 3, 2011.
(Continued)

*Primary Examiner* — Ping Hsieh
(74) *Attorney, Agent, or Firm* — Oppedahl Patent Law Firm LLC

(57) ABSTRACT

The disclosure discloses a method and device for realizing Specific Absorption Rate (SAR) control, in both of which phase shifters can be provided on a metal ground edge of a wireless terminal, and an induced current of the metal ground edge can be altered by applying the phase shifters, so as to reduce an antenna near field radiation characteristic of an SAR. The method and device of the disclosure can alter current phase and amplitude distribution of the metal ground without affecting the reception and transmission performance of the terminal, so as to reduce a local SAR peak value and lessen the harm of radiation to human bodies. Furthermore, the disclosure does not require any major change in a structure, circuit, and, antenna of a designed model, and can save space. The disclosure bears great flexibility and adaptability in an application, thereby realizing the objective of miniaturized design of the wireless terminal.

12 Claims, 2 Drawing Sheets

(51) Int. Cl.
*H04B 1/3827* (2015.01)
*H01Q 1/52* (2006.01)
*H01Q 9/30* (2006.01)
*H01Q 1/22* (2006.01)
*H01Q 1/24* (2006.01)

(56) References Cited

U.S. PATENT DOCUMENTS

| | | | |
|---|---|---|---|
| 2006/0139216 A1 | 6/2006 | Glocker et al. | |
| 2008/0074163 A1 | 3/2008 | Itagaki | |
| 2009/0318094 A1* | 12/2009 | Pros | H01Q 1/245 455/75 |
| 2011/0021139 A1* | 1/2011 | Montgomery | H04B 5/0081 455/41.1 |
| 2011/0090126 A1* | 4/2011 | Szini | H01Q 1/245 343/702 |

FOREIGN PATENT DOCUMENTS

| | | |
|---|---|---|
| CN | 101110490 A | 1/2008 |
| CN | 101277139 A | 10/2008 |
| CN | 101867384 A | 10/2010 |
| CN | 101926049 A | 12/2010 |
| JP | 2005295002 A | 10/2005 |
| WO | 2010138453 A2 | 12/2010 |

OTHER PUBLICATIONS

English Translation of the Written Opinion of the International Search Authority in international application No. PCT/CN2011/075100, mailed on Nov. 3, 2011.

* cited by examiner

METHOD AND DEVICE FOR REALIZING SPECIFIC ABSORPTION RATE (SAR) CONTROL

TECHNICAL FIELD

The disclosure relates to the communication field and in particular to a method and device for realizing Specific Absorption Rate (SAR) control.

BACKGROUND

With the rapid development of wireless communication technology, wireless terminals (mobile phone, data card, MiFi/Hotspot product) have been applied more and more widely. At the same time, the influence of electromagnetic radiation on human bodies brought about by the wireless terminal has become a public concern.

Most existing SAR reducing techniques adopt a method such as reduction of transmitter power, use of wave absorbing material or of a conductor reflector and shield, and radiation-proof and wave-absorbing coating on a casing surface, etc., which will not only increase costs and process complexity, but also affect a communication signal, thereby failing to fundamentally solve the contradiction between human body radiation safety and high-quality wireless communication. In addition, more space is required for the location of the reflector and shield during assembly, which is contrary to the purpose of miniaturized design of the wireless terminal.

Additionally, a mechanism of forming a local SAR peak value is the joint contribution from the surface current of an antenna conductor per se and the surface current induced on metal surfaces in the antenna near field, such as a Printed Circuit Board (PCB) metal ground, a shielding cover, and a shielding frame. In a wireless terminal device, the exposed circuit shielding cover, PCB substrate metal ground, housing, and the antenna would interact with each other to form a complicated boundary condition. The SAR peak value generally appears near a maximum local current at the antenna or a PCB metal surface. Currently, the parasitic conductor structures such as a PCB grooving or a conductive ring structure are usually added near the antenna or on the PCB to alter the surface current distribution, so as to reduce an SAR value. However, such technique takes up much more space, and is applicable to one-directional SAR reduction for a product such as the mobile phone, but not applicable to a data card wireless terminal product.

SUMMARY

In view of this, the main objective of the disclosure is to provide a method and device for realizing SAR control, so as to reduce the local SAR peak value and lessen the harm of radiation to human bodies.

To achieve this objective, the technical solution of the disclosure is realized as follows.

A method for realizing Specific Absorption Rate (SAR) control, includes:

providing phase shifters on the metal ground edge of a wireless terminal; and altering an induced current of the metal ground edge by applying the phase shifters, such that an antenna near field radiation characteristic of an SAR can be reduced.

The providing phase shifters may be:

introducing the phase shifters consisting of a plurality of lumped circuit elements on the PCB metal ground edge of the wireless terminal.

The altering an induced current of the metal ground edge may be:

altering an induced current distribution on a PCB of the wireless terminal by altering magnitudes of phase shift and locations of the phase shifters on a metal ground.

Altering the antenna near field radiation characteristic may be:

altering phases and amplitudes of current elements on the metal ground edge by applying the phase shifters, so that these current elements produce a reversed-phase superposition during near-field radiation to reduce the value of the SAR.

The method may further include:

performing real-time monitoring of a phase and amplitude of the induced current on the metal ground edge through electronic tuning control, and adjusting phase shift values of the phase shifters correspondingly to realize dynamical/real-time adjustment of an SAR value.

A device for realizing Specific Absorption Rate (SAR) control, includes a structure of a wireless terminal, wherein phase shifters are provided on the metal ground edge of the device, the phase shifters being configured to alter an induced current of the metal ground edge such that an antenna near field radiation characteristic of an SAR can be reduced.

The phase shifters may be realized through a passive lumped element or an active element;

the passive lumped element may include one of a Resistor-Capacitor (RC) phase shifting network, an inductor-Capacitor (LC) phase shifting network, a diode phase shifter, and a ferrite phase shifter; and the active element may include one of an operational amplifier, a switch, a variable capacitance diode, and a reversible dual-mode ferrite phase shifter.

The phase shifters may be provided on the PCB metal ground edge of the wireless terminal, on specific locations determined by an induced current distribution, in surface induced current accumulation areas.

A PCB metal edge area and a PCB central area in the device may be divided through slotting, and the phase shifters may bridge both sides of a slot formed by the slotting; or a ground plane of an interlayer of a multi-layer PCB may be used as a reference ground (GND), and a circuit network of the phase shifters may be connected through an inter-layer through hole structure.

The phase shifters may be further configured to perform real-time monitoring of a phase and amplitude of the induced current on the PCB metal ground edge and adjust phase shift values correspondingly to realize dynamical/real-time adjustment of an SAR value The method and device of the disclosure can alter current phase and amplitude distribution of the metal ground without affecting the reception and transmission performance of the terminal, so as to reduce a local SAR peak value and lessen the harm of radiation to human bodies. Furthermore, the disclosure does not require any major change in a structure, circuit, and, antenna of a designed model, and can save space. The disclosure bears great flexibility and adaptability in an application, thereby realizing the objective of miniaturized design of the wireless terminal.

DETAILED DESCRIPTION

Figure 1:
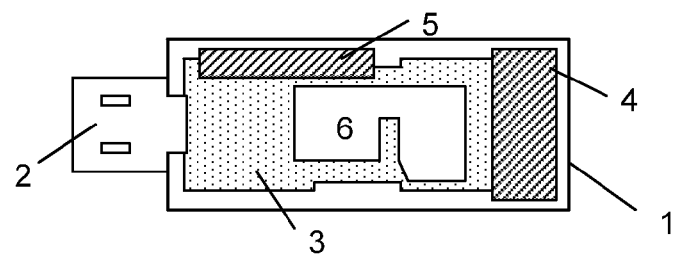
FIG. 1 is the diagram of the two-dimensional structure of a common wireless terminal data card.

Generally speaking, in order to reduce a SAR value without affecting the overall radiation quality of an antenna of a wireless terminal, phase shifters consisting of a plurality of lumped circuit elements may be introduced on a PCB metal ground edge of a data card to alter an antenna near field radiation characteristic by altering a phase and distribution of an induced current of the PCB metal ground edge, thereby achieving the objective of reducing the SAR value.

To achieve this objective, the technical solution of the disclosure is realized as follows:

specifically, the wireless terminal may include: a single-layer/multi-layer PCB with a radio frequency baseband circuit, a main antenna for transmission and reception, a diversity/MIMO antenna for reception, a structure housing, a USB connector, and a plurality of phase shifters located on the PCB metal ground edge. As the plurality of phase shifters are added on the PCB metal ground edge of the wireless terminal, therefore by altering phases and amplitudes of current elements on the metal ground edge, these current elements may produce a reversed-phase superposition during near-field radiation, thereby reducing a local field strength peak value. Specifically, an induced current distribution on the PCB may be altered by altering magnitudes of phase shift and amplitude shift as well as locations of the phase shifters on a medal ground. The phase shifters may be realized through a passive lumped element, such as one of a Resistor-Capacitor (RC) phase shifting network, an inductor-Capacitor (LC) phase shifting network, a diode phase shifter, and a ferrite phase shifter, etc.; or may also be realized through an active element, such as one of an operational amplifier, a switch, a variable capacitance diode, and a reversible dual-mode ferrite phase shifter, etc. Further, real-time monitoring of a phase and amplitude of the induced current on the PCB metal ground edge may be performed through electronic tuning control, and a phase shift value of each phase shifter may be adjusted correspondingly, so as to realize a function of dynamical/real-time adjustment of an SAR value.

According to the antenna theory, an antenna near-field is determined by the radiation superposition of each sub-current source or element, and an electric field local extreme value may be formed in the case of phase coincidence. At the same time, a transmitting antenna induces a current on a surface of the PCB, wherein the current usually accumulates around the metal ground edge. Therefore, additional phase shift may be introduced to a surface current in a relatively small physical space via lumped-element phase shifters, causing phase cancellation of each sub-current source or element or increasing random perturbation of the surface current, so that near-field radiation is distributed as uniformly as possible, thus reducing an SAR hotspot peak value. At the same time, the phase shifters do not notably weaken an antenna far-field radiation characteristic of the data card, thus ensuring the quality of a communication signal.

In addition, as the phase shifters are only added on the PCB metal ground edge, not much physical space is required, and there is much flexibility and adaptability in application, which facilitates miniaturized design of the wireless terminal.

In a practical application, a current mainstream data card type wireless terminal device mostly adopts the form of a cube, and is connected to a laptop through a USB connector at an end. Meanwhile, a multi-mode data card (WCDMA, CDMA2000, and LTE etc.) generally adopts a dual-antenna structure: the main antenna is responsible for transmission and reception, and an auxiliary antenna (MIMO antenna) is responsible for reception. The quality of the received signal and transmission throughput can be improved effectively through dual-path reception. FIG. 1 is a two-dimensional view of a dual-antenna data card terminal, wherein an end of a data card housing 1 is provided with a USB connector 2. The data card housing 1 further includes a PCB 3 provided with a circuit element, a metal ground, and a shielding cover 6. A main antenna area 4 is located at the top of the data card, and an auxiliary antenna area 5 is usually located on a side of the data card. As required by miniaturization of a data card type terminal product, the main antenna is usually designed into the form of a monopole 7, while the PCB 3 functions as a ground of the monopole antenna. When the main antenna operates, the metal ground of the PCB 3 is involved in the radiation, and serves as another part of antenna radiation.

Figure 2:
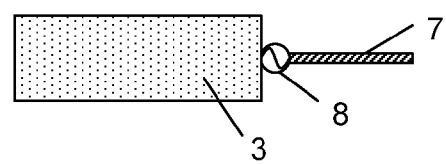
FIG. 2 is the schematic diagram of equivalent operation of a monopole antenna on a wireless terminal.

FIG. 2 is a diagram of the equivalent operation principle of a small antenna of the monopole type. A feed source 8 feeds monopole antenna 7 and the metal ground of PCB 3. The whole data card radiation unit may be equivalent to a dipole antenna with an unbalanced structure. Relatively large unbalanced induced currents exist on the metal ground of PCB 3 due to the existence of the unbalanced structure. Secondary radiation of these induced currents and radiation of the current on monopole antenna 7 have phase superposition in the near field, forming local accumulation of electromagnetic energy. Generally, all monopole-type terminal small antenna have relatively high SAR values.

Figure 3:
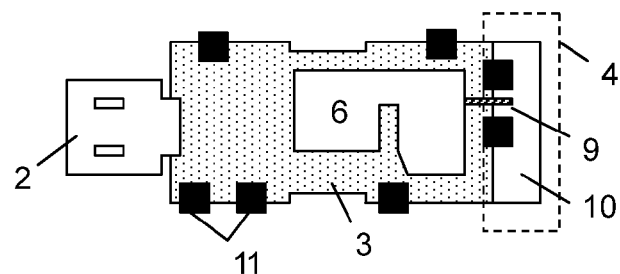
FIG. 3 is the schematic diagram of the two-dimensional structure of a low-SAR data card with a plurality of phase shifters.

In order to reduce an SAR value, perturbation may be performed to induced currents on PCB 3 to intervene in the phase superposition of near field radiation. Specifically, the plurality of phase shifters may be added to the metal ground edge of the PCB to alter the phase and amplitude distribution of a sub-current source or element of the metal ground edge. FIG. 3 is an application example of a low-SAR data card, wherein a radio frequency feeder 6 is connected to a radio frequency power amplifier output terminal and a main antenna feeding point. The feeder 9 usually has a relatively large surface current, and is not connected to the metal ground of PCB 3. Main antenna area 4 includes clearance area 10 on the PCB, configured to ensure the radiation performance of the monopole antenna. A plurality of phase shifting units 11 are placed on the metal ground edge of PCB 3 and are configured to provide additional phase and amplitude bias for an accumulated current. The phase of various sub-current elements cancels, thus reducing a near field SAR hotspot peak value. Locations of the phase shifting units are determined by the induced current distribution, and the phase shifting units should be placed in surface induced current accumulation areas in principle, e.g. on the PCB metal ground edge and near the area of the feeder 9.

Figure 4A:
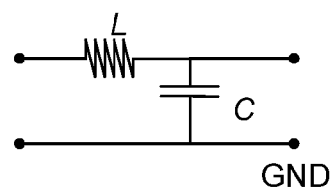
FIG. 4a and FIG. 4b are schematic diagrams of circuit forms of an LC phase shifting network and an RC phase shifting network.
Figure 4B:
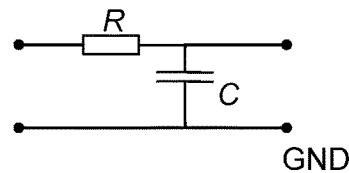

Additionally, the phase shifters may be realized in various forms. FIG. 4 illustrates two simple passive lumped element phase shifter circuits, wherein FIG. 4a is an LC phase shifting network while FIG. 4b is an RC phase shifting network. The specific rated value of each element is calculated from a required phase shift amount and an operating frequency. It should be noted that both circuit networks need a unified reference ground (GND) plane.

Figure 5A:
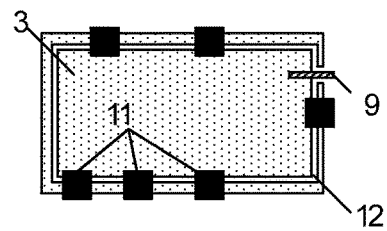
FIG. 5a and FIG. 5b are schematic diagrams of two ways of loading phase shifters on a PCB metal ground edge.
Figure 5B:
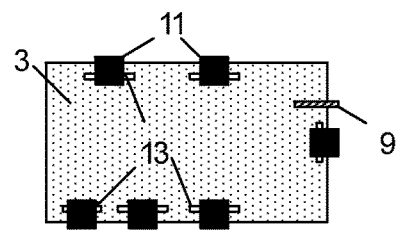

In view of the requirement of a circuit network in FIG. 3 on the GND, FIG. 4 provides two realization solutions for loading the phase shifters on the PCB metal ground edge. According to a current edge effect and proximity effect, a high-frequency surface current usually accumulates in the edge portion of the PCB metal ground, while a current in the central area of the metal ground is relatively small. Therefore, with respect to the edge, the central area of the metal ground may serve equivalently as the GND of a high-frequency signal. Slotting is adopted as shown in the figures; An elongated through slot 12 as shown in FIG. 5a and local slots 13 as shown in FIG. 5b are adopted to divide a PCB metal edge area and a PCB central area. The phase shifters bridge both sides of the elongated through slot 12 or of a local slot 13, and may realize layout and wiring of the RC or LC circuit network. Another feasible solution is that the ground plane of an interlayer of the multi-layer PCB is taken as the GND, and connection of the circuit network of the phase shifters is realized through an inter-layer through hole structure.

Figure 6:
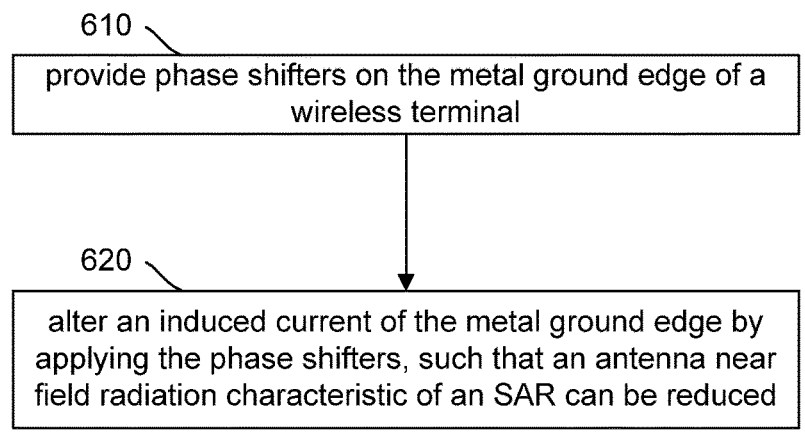
FIG. 6 is the flowchart for realizing SAR control according to an embodiment of the disclosure.

It can be learned from the aforementioned technical description that a general thought for realizing SAR control may be as shown in FIG. 6. Referring to FIG. 6, which is the flowchart for realizing SAR control according to an embodiment of the disclosure, the flow includes the following steps:

Step 610: phase shifters are provided on a metal ground edge of a wireless terminal; and Step 620: an induced current of the metal ground edge is altered by applying the phase shifters, such that an antenna near field radiation characteristic of an SAR can be reduced.

To sum up, it can be seen that the technique for adding a plurality of phase shifting units on a PCB edge of a wireless terminal product provided by an embodiment of the disclosure may alter current phase and amplitude distribution of the metal ground without affecting the reception and transmission performance of the terminal, so as to reduce a local SAR peak value and lessen the harm of radiation to human bodies. Furthermore, the disclosure does not require any major change in a structure, circuit, and, antenna of a designed model, and can save space. The disclosure bears great flexibility and adaptability in an application, thereby realizing the objective of miniaturized design of the wireless terminal.

In addition, the disclosure does not impose any specific limitation on the structures and way of connection of the phase shifters. Adoption of other kinds of phase shifter circuit structures which are not mentioned in the disclosure falls in the protection scope of the disclosure. What described are only preferred embodiments of the disclosure and should not be used for limiting the protection scope of disclosure. Any modification, equivalent replacement, improvement, and the like made within the spirit and principle of the disclosure shall fall within the scope of protection of the disclosure.

The invention claimed is:

1. A method for realizing Specific Absorption Rate (SAR) control, comprising:
providing phase shifters on the metal ground edge of a wireless terminal; and
altering an induced current of the metal ground edge by applying the phase shifters, such that an antenna near field radiation characteristic of an SAR can be reduced,
wherein the altering an induced current of the metal ground edge is:
altering an induced current distribution on a PCB of the wireless terminal by altering magnitudes of phase shift and locations of the phase shifters on the metal ground,
wherein the phase shifters are provided on specific locations determined by the induced current distribution on the PCB, in surface induced current accumulation areas to introduce additional phase shift to a surface current for phase cancellation among current elements or for random perturbation to the surface current to maximize uniformity in distribution of near-field radiation.

2. The method according to claim 1, wherein the providing phase shifters is:
introducing the phase shifters consisting of a plurality of lumped circuit elements on the PCB metal ground edge of the wireless terminal.

3. The method according to claim 2, wherein the antenna near field radiation characteristic is reduced by:
altering phases and amplitudes of the current elements on the metal ground edge by applying the phase shifters, so that the current elements produce a reversed-phase superposition during near-field radiation to reduce the value of the SAR.

4. The method according to claim 2, further comprising:
performing real-time monitoring of a phase and amplitude of the induced current on the metal ground edge through electronic tuning control, and adjusting phase shift values of the phase shifters correspondingly to realize dynamical/real-time adjustment of an SAR value.

5. The method according to claim 1, wherein the antenna near field radiation characteristic is reduced by:
altering phases and amplitudes of the current elements on the metal ground edge by applying the phase shifters, so that the current elements produce a reversed-phase superposition during near-field radiation to reduce the value of the SAR.

6. The method according to claim 1, further comprising:
performing real-time monitoring of a phase and amplitude of the induced current on the metal ground edge through electronic tuning control, and adjusting phase shift values of the phase shifters correspondingly to realize dynamical/real-time adjustment of an SAR value.

7. A device for realizing Specific Absorption Rate (SAR) control, comprising a structure of a wireless terminal, wherein phase shifters are provided on the metal ground edge of the device, the phase shifters being configured to alter an induced current of the metal ground edge such that an antenna near field radiation characteristic of an SAR can be reduced,
wherein an induced current distribution on a PCB of the device is altered by altering magnitudes of phase shift and locations of the phase shifters on the metal ground,
wherein the phase shifters are provided on specific locations determined by the induced current distribution on the PCB, in surface induced current accumulation areas to introduce additional phase shift to a surface current for phase cancellation among current elements or for random perturbation to the surface current to maximize uniformity in distribution of near-field radiation.

8. The device according to claim 7, wherein the phase shifters are realized through a passive lumped element or an active element;
- the passive lumped element comprises one of a Resistor-Capacitor (RC) phase shifting network, an inductor-Capacitor (LC) phase shifting network, a diode phase shifter, and a ferrite phase shifter; and
- the active element comprises one of an operational amplifier, a switch, a variable capacitance diode, and a reversible dual-mode ferrite phase shifter.

9. The device according to claim 8, wherein
- a PCB metal edge area and a PCB central area in the device are divided through slotting, and the phase shifters bridge both sides of a slot formed by the slotting; or
- a ground plane of an interlayer of a multi-layer PCB is used as a reference ground (GND), and a circuit network of the phase shifters is connected through an inter-layer through hole structure.

10. The device according to claim 8, wherein the phase shifters are further configured to perform real-time monitoring of a phase and amplitude of the induced current on a PCB metal ground edge, and to adjust phase shift values correspondingly to realize dynamical/real-time adjustment of an SAR value.

11. The device according to claim 7, wherein
- a PCB metal edge area and a PCB central area in the device are divided through slotting, and the phase shifters bridge both sides of a slot formed by the slotting; or
- a ground plane of an interlayer of a multi-layer PCB is used as a reference ground (GND), and a circuit network of the phase shifters is connected through an inter-layer through hole structure.

12. The device according to claim 7, wherein the phase shifters are further configured to perform real-time monitoring of a phase and amplitude of the induced current on a PCB metal ground edge, and to adjust phase shift values correspondingly to realize dynamical/real-time adjustment of an SAR value.

* * * * *